US012031701B2

(12) United States Patent
Van Bommel et al.

(10) Patent No.: US 12,031,701 B2
(45) Date of Patent: Jul. 9, 2024

(54) LIGHT EMITTING DEVICE AND A LUMINAIRE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/034,123

(22) PCT Filed: Oct. 20, 2021

(86) PCT No.: PCT/EP2021/079118

§ 371 (c)(1),
(2) Date: Apr. 27, 2023

(87) PCT Pub. No.: WO2022/090032

PCT Pub. Date: May 5, 2022

(65) Prior Publication Data

US 2023/0392770 A1 Dec. 7, 2023

(30) Foreign Application Priority Data

Oct. 29, 2020 (EP) .................................... 20204570

(51) Int. Cl.
*F21V 19/00* (2006.01)
*F21V 9/30* (2018.01)
(Continued)

(52) U.S. Cl.
CPC .............. *F21V 19/002* (2013.01); *F21V 9/30* (2018.02); *F21Y 2105/12* (2016.08); *F21Y 2113/10* (2016.08); *F21Y 2115/10* (2016.08)

(58) Field of Classification Search
CPC ...... F21V 19/002; F21V 9/30; F21Y 2105/12; F21Y 2113/10; F21Y 2115/10
See application file for complete search history.

(56) References Cited

U.S. PATENT DOCUMENTS

2003/0072153 A1 4/2003 Matsui et al.
2006/0138951 A1 6/2006 Tain et al.
(Continued)

FOREIGN PATENT DOCUMENTS

CN 101358716 A 2/2009
CN 202209554 U 5/2012
(Continued)

*Primary Examiner* — Mary Ellen Bowman

(57) ABSTRACT

The present invention relates to a light emitting device (100). The light emitting device comprising a carrier (130). The carrier comprising a first plurality of LEDs (110) arranged in a matrix arrangement, the matrix arrangement having a plurality of LED columns (112, 114, 116) and a plurality of LED rows (113, 115, 117), wherein LED columns of the plurality of LED columns (112, 114, 116) are spaced apart from each other with a first spacing (S1) and LED rows of the plurality of LED rows (113, 115, 117) are spaced apart from each other with a second spacing (S2) and, a second plurality of LEDs (120) arranged in a linear arrangement, the linear arrangement having a length (L) larger than a width (W), wherein LEDs of the second plurality of LEDs (120) are spaced apart from each other with a third spacing (S3), the third spacing (S3) being smaller than the first and the second spacings (S1, S2) and wherein the second plurality of LEDs (120) are arranged in between LEDs of the first plurality of LEDs (110) and within the first and the second spacings (S1, S2).

13 Claims, 3 Drawing Sheets

(51) Int. Cl.

| | |
|---|---|
| ***F21Y 105/12*** | (2016.01) |
| ***F21Y 113/10*** | (2016.01) |
| ***F21Y 115/10*** | (2016.01) |

(56) References Cited

U.S. PATENT DOCUMENTS

| | | | |
|---|---|---|---|
| 2010/0220046 | A1 | 9/2010 | Plötz et al. |
| 2019/0212004 | A1 | 7/2019 | Van Bommel et al. |

FOREIGN PATENT DOCUMENTS

| | | | |
|---|---|---|---|
| CN | 204100141 | U | 1/2015 |
| CN | 206802778 | U | 12/2017 |
| DE | 102016206896 | A1 | 10/2017 |
| JP | 2002132192 | A | 5/2002 |
| WO | 2011086176 | A1 | 7/2011 |
| WO | 2020089146 | A1 | 5/2020 |

LIGHT EMITTING DEVICE AND A LUMINAIRE

CROSS-REFERENCE TO PRIOR APPLICATIONS

This application is the U.S. National Phase application under 35 U.S.C. § 371 of International Application No. PCT/EP2021/079118, filed on Oct. 20, 2021, which claims the benefit of European Patent Application No. 20204570.4, filed on Oct. 29, 2020. These applications are hereby incorporated by reference herein.

FIELD OF THE INVENTION

The invention relates to a light emitting device and a luminaire.

BACKGROUND OF THE INVENTION

Over the past years, various types of filaments and lamps have been developed. An example of such filaments is an LED filament. So far, various types of LED filaments and various assemblies of such LED filaments have been developed.

However, it is still desired to improve an appearance of such LED filaments. In addition, it is desired to reduce a cost of producing such LED filaments. Furthermore, it is desired to improve assembly of such LED filaments.

SUMMARY OF THE INVENTION

It is an object of the present invention to overcome at least some of the above problems.

According to a first aspect, a light emitting device is provided. The light emitting device comprises a carrier. The carrier comprises a first plurality of LEDs arranged in a matrix arrangement, the matrix arrangement having a plurality of LED columns and a plurality of LED rows, wherein LED columns of the plurality of LED columns are spaced apart from each other with a first spacing and LED rows of the plurality of LED rows are spaced apart from each other with a second spacing. The carrier further comprises a second plurality of LEDs arranged in a linear arrangement, the linear arrangement having a length larger than a width, wherein LEDs of the second plurality of LEDs are spaced apart from each other with a third spacing, the third spacing being smaller than the first and the second spacings and wherein the second plurality of LEDs are arranged in between LEDs of the first plurality of LEDs and within the first and the second spacings.

Thereby, the first plurality of LEDs, arranged in the matrix arrangement, provides matrix light. The matrix light comprises a plurality of point source light. The second plurality of LEDs, arranged in the linear arrangement, provides a line emission. Thereby, the light emitting device with an improved lighting and improved appearance is provided, as the light emitting device comprises two arrangements of LEDs. In addition, the inventive concept facilitates assembling the first and the second plurality of LEDs on the same carrier. Thereby, a cost of producing such light emitting device may be reduced.

By the "plurality of LEDs" is hereby meant any type of LEDs such as LEDs configured to emit light of a color temperatures e.g. high or low color temperature or colored LEDs e.g. RGB LEDs.

By the first plurality of LEDs arranged in the "matrix arrangement" is hereby meant that the first plurality of LEDs is arranged in a regular and ordered manner. Examples of the matrix arrangement, having the plurality of LED columns and the plurality of LED rows, are a square-shaped pattern and a hexagonal-shaped pattern.

By the second plurality of LEDs arranged in the "linear arrangement" is hereby meant that the second plurality of LEDs are arranged in an array configuration such that the array configuration is arranged with various forms and shapes on the carrier.

The second plurality of LEDs arranged in the linear arrangement may be seen as a LED filament or may be a filament. A LED filament is providing LED filament light and comprises a plurality of light emitting diodes (LEDs) arranged in a linear array. Preferably, the LED filament has a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil). The substrate may comprise a glue e.g. a surface of the substrate may comprise a glue. The glue may be covered by a cover such that the cover may be removed, and the substrate may be fixed on a surface. In case the carrier comprises a first major surface and an opposite second major surface, the LEDs are arranged on at least one of these surfaces. The carrier may be reflective or light transmissive, such as translucent and preferably transparent. The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods. The LED filament may comprise multiple sub-filaments.

A ratio between a number of LEDs of the second plurality of LEDs arranged along the length and a number of LEDs of the second plurality of LEDs arranged along the width may at least be 10. Thereby, a length-to-width ratio of the second plurality of LEDs may be at least be 10. This may in turn improve the line emission of the second plurality of LEDs i.e. that the emission from the second plurality of LEDs may look more like a line emission.

The length of the second plurality of LEDs may at least be twice a length of an LED column of the plurality of LED columns and/or may be twice a length of an LED row of the plurality of LED rows of the first plurality of LEDs. This may in turn facilitate arranging the second plurality of LEDs in between LEDs of the first plurality of LEDs with various forms and shapes. Thereby, the appearance of the light emitting device may be improved even more.

The first spacing and the second spacing may at least be three times larger than the third spacing. Thereby the first and the second spacings may be large enough such that the second plurality of LEDs be arranged in between the LEDs of the first plurality of LEDs and within the first and the second spacings. This may in turn facilitate arranging the second plurality of LEDs in between LEDs of the first plurality of LEDs and within the first and the second spacings.

The first plurality of LEDs may provide first light and the second plurality of LEDs may provide second light. The first light and second light may differ in one or more of color point, color temperature, and color rendering index. For instance, the first plurality of LEDs may be RGB LEDs. The second plurality of LEDs may be white LEDs. Another example, the first plurality of LEDs may be LEDs with color temperature tunability. The second plurality of LEDs may not be LEDs with color temperature tunability. Thereby, light with different color points, color temperatures, and/or color rendering indexes may be achieved. This may in turn provide the light emitting device with a color mixing and color temperature tunability.

The first plurality of LEDs may be encapsulated by a first encapsulant comprising a first luminescent material. The second plurality of LEDs may be encapsulated by a second encapsulant comprising a second luminescent material. The first and the second encapsulants may be different. For instance, the first and the second encapsulants may differ in one or more of the following: concentration of the luminescent material, thickness of the luminescent material, and/or the luminescent material type. Thereby, the color temperature of the first and the second plurality of LEDs may be tuned by tuning the first encapsulant and the second encapsulant. This may in turn improve the color temperature tunability of the first and the second plurality of LEDs.

LEDs of the first plurality of LEDs may be configured to emit light of a first color temperature, CT1. The LEDs of the second plurality of LEDs may be configured to emit light of a second color temperature, CT2. The second color temperature, CT2, may be different from the first color temperature, CT1. The first color temperature, CT1, may be larger than 2700 K. The second color temperature, CT2, may be smaller than 2400 K. The difference between the first color temperature and the second color temperature may preferably be larger than 300K, $CT1-CT2>300$ K The difference between the first and the second color temperature may more preferably be larger than 500K, $CT1-CT2>500$ K. The difference between the first and the second color temperature may most preferably be larger than 700K, $CT1-CT2>700$ K. In other words, the first color temperature may correspond to a warm white color temperature. The second color temperature may correspond to a cold white color temperature. The abovementioned color temperature criteria may improve the color temperature tunability of the LED filament.

A luminous flux of each LED of the first plurality of LEDs may at least be twice a luminous flux of each LED of the second plurality of LEDs. Thereby, the light emitting device with an improved lighting may be achieved.

The light emitting device may further comprise a light diffusive layer. The light diffusive layer may be arranged above the first and the second plurality of LEDs. The light diffusive layer may diffuse light emitted by the matrix arrangements and linear arrangement. The light diffusive layer may provide a more uniform illumination. The light diffusive layer may provide a more efficient lighting than a light emitting device with no light diffusive layer.

The light emitting device may further comprise a patterned light exit window. The patterned light exit window may be arranged above the first and the second plurality of LEDs. The patterned light exit window may comprise a first pattern area and a second pattern area. The first pattern area may be arranged above the first plurality of LEDs. The second pattern area may be arranged above the second plurality of LED. The first pattern area and the second pattern area may have different light transmissions. Alternatively or in combination, the first pattern area and the second pattern area may have different absorptions. Alternatively or in combination, the first pattern area and the second pattern area may have different reflections. For instance, one of the first pattern area or the second pattern area may be more diffused than the other one. Thereby, the light emitting device with different transmissions, absorptions and/or reflections may be achieved.

The carrier may be light transmissive. Thereby the carrier may transmit the light emitted by the first and the second plurality of LEDs. For instance, a back side of the carrier may face outwards to transmit the light emitted from the first and the second plurality of LEDs. In the case of the light transmissive carrier, the light emitting device may further comprise a reflective layer. The reflective layer may reflect the light emitted by the first and the second plurality of LEDs. Thereby the reflective layer may improve the lighting of the light emitting device.

The plurality of LED columns of the first plurality of LEDs may comprise at least three LED columns. The plurality of LED rows of the first plurality of LEDs may comprise at least three LED rows. The plurality of LED columns of the first plurality of LEDs may preferably comprise at least five LED columns. The plurality of LED rows of the first plurality of LEDs may preferably comprise at least five LED rows. The plurality of LED columns of the first plurality of LEDs may more preferably comprise at least six LED columns. The plurality of LED rows of the first plurality of LEDs may more preferably comprise at least six LED rows. Thereby the matrix light provided by the first plurality of LEDs may be improved i.e. the matrix light may comprise more number of point source light.

The first plurality of LEDs may be electrically connected to each other. The second plurality of LEDs may be electrically connected to each other. The first and the second plurality of LEDs may be independently controllable. The light emitting device may further comprise a controller for independently controlling the first plurality of LEDs and the second plurality of LEDs. Thereby the first plurality of LEDs and the second plurality of LEDs may independently be controllable. This in turn may improve, the appearance, the color mixing and the color temperature tunability of the light emitting device. The first plurality of LEDs may preferably be connected in series. The second plurality of LEDs may preferably be connected in series.

By “independently controlling” is hereby meant that the first plurality of LEDs or the second plurality of LEDs each subset of LEDs may be controllable regardless of status of the other one. For instance, the first plurality of LEDs may be turned on, off, or an intensity of the first plurality of LEDs may be varied regardless of status of the second plurality of LEDs.

The second plurality of LEDs may be arranged in a meandering configuration and/or a spiral configuration. The meandering configuration and/or the spiral configuration may comprise a plurality of turns.

According to a second aspect of the invention, a luminaire is provided. The luminaire comprises a light emitting device, according to the first aspect of the invention. This aspect may generally present the same or corresponding advantages as the former aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to the appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
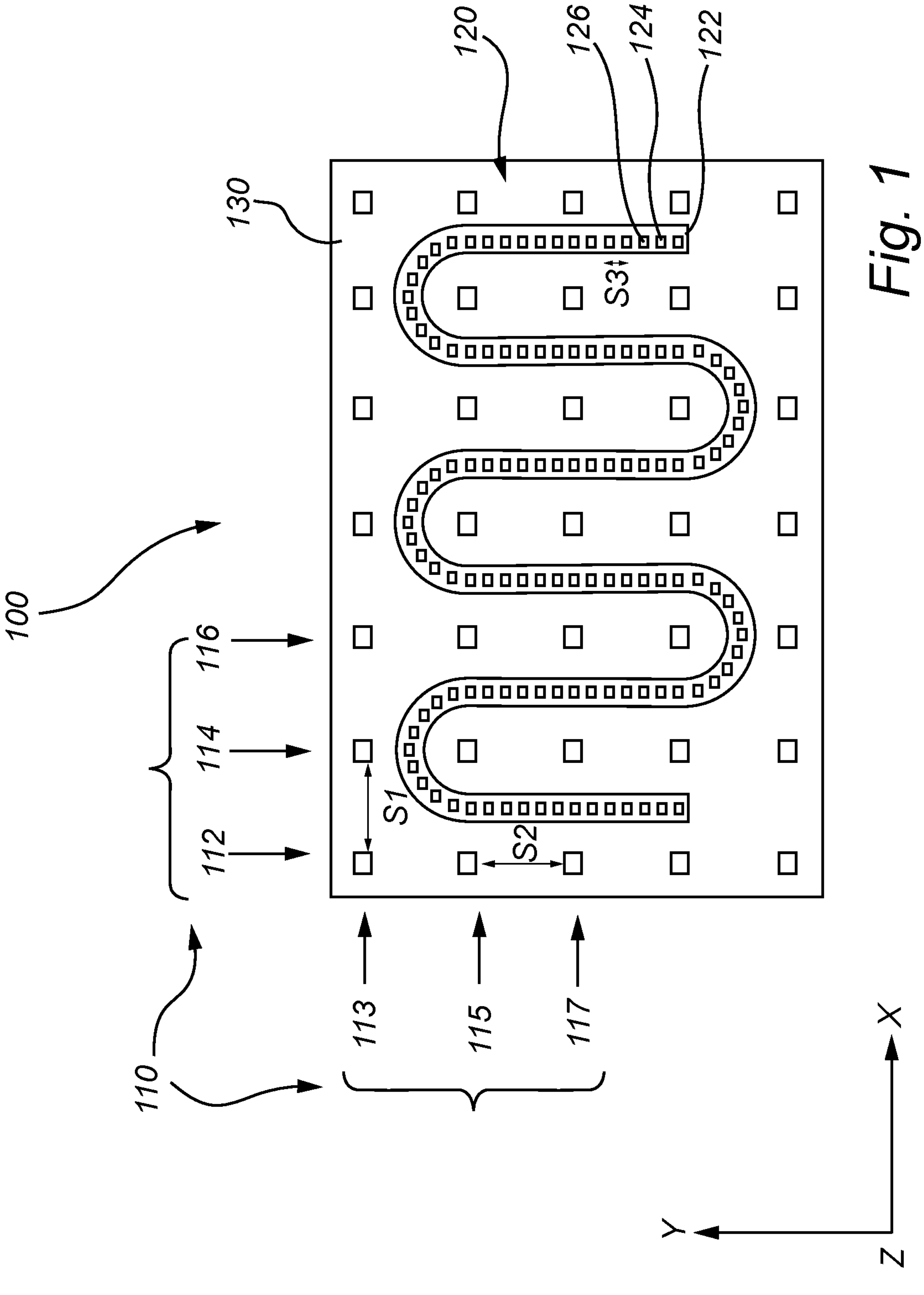
FIG. 1 schematically illustrates a front-view of a light emitting device comprising a first plurality of LEDs and a second plurality of LEDs.

In connection with FIG. 1, a light emitting device 100 is illustrated. In FIG. 1, directions Y and X respectively indicates a longitudinal and a horizontal direction of the light emitting device 100. In FIG. 1, direction Z indicates a direction perpendicular to the X and Y directions. The light emitting device 100 shown in FIG. 1 comprises a carrier 130. The carrier 130 may have a one-dimensional shape having two opposing surfaces. The carrier 130 may have any other shapes. FIG. 1 shows a front surface of the carrier 130. The carrier 130 may be a substrate. The carrier 130 may be flexible such as a flexible substrate. The carrier 130 may be light transmissive. The carrier 130 may be formed of a polymer and/or polyimide. A dimension of the carrier 130 along the X direction may be in the range of 3 to 60 cm. A dimension of the carrier 130 along the Y direction may be in the range of 3 to 60 cm.

Still in connection with FIG. 1, the carrier 130 comprises a first plurality of LEDs 110. The first plurality of LEDs 110 may be arranged on the surface of the carrier 130 in a manner which per se is known in the art. For instance, the first plurality of LEDs 110 may be attached via a glue or a solder to the carrier 130. The first plurality of LEDs 110 may be directly mounted onto the carrier 130. Alternatively, the first plurality of LEDs 110 may be mounted onto a first carrier. The first carrier may be arranged on the carrier 130. The first carrier may be flexible. The first plurality of LEDs 110 is arranged in a matrix arrangement. The matrix arrangement shown in FIG. 1 has a square-shaped pattern. The matrix arrangement may have any other regular and ordered pattern such as a hexagonal-shaped pattern. The matrix arrangement has a plurality of LED columns 112, 114, 116. The plurality of LED columns 112, 114, 116 of the first plurality of LEDs 110 may comprises at least three LED columns. A length of an LED column of the plurality of LED columns 112, 114, 116 may be in the range of 3 to 60 cm along the Y direction. FIG. 1 shows that LED columns of the plurality of LED columns 112, 114, 116 are spaced apart from each other with a first spacing S1. The first spacing S1 may be in the range of 5 to 50 mm. The matrix arrangement further has a plurality of LED rows 113, 115, 117. The plurality of LED rows 113, 115, 117 of the first plurality of LEDs 110 may comprise at least three LED rows. A length of an LED row of the plurality of LED columns 113, 115, 117 may be in the range of 3 to 60 cm along the X direction. FIG. 1 further shows that LED rows of the plurality of LED rows 113, 115, 117 are spaced apart from each other with a second spacing S2. The second spacing S2 may be in the range of 5 to 50 mm. The second spacing S2 may be the same as the first spacing S1. The second spacing S2 need not be the same as the first spacing S1. The matrix arrangement may have one LED at an intersection of a column of the plurality of LED columns 112, 114, 116 and a row of the plurality of LED rows 113, 115, 117. The matrix arrangement may have more than one LED at an intersection of a column of the plurality of LED columns 112, 114, 116 and a row of the plurality of LED rows 113, 115, 117. The first plurality of LEDs may be electrically connected to each other. For instance, the first plurality of LEDs may be electrically connected in series with each other.

Still in connection with FIG. 1, the carrier 130 further comprises a second plurality of LEDs 120. The second plurality of LEDs 120 may be arranged on the surface of the carrier 130 in a manner which per se is known in the art. For instance, the second plurality of LEDs 120 may be attached via a glue or a solder to the carrier 130. The second plurality of LEDs 120 may be directly mounted onto the carrier 130. Alternatively, the second plurality of LEDs 120 may be mounted onto a second carrier. The second carrier may be arranged on the carrier 130. The second carrier may be flexible. In the case that the second plurality of LEDs 120 are arranged on the second carrier, the second carrier may have the same shape and form as the second plurality of LEDs. The second plurality of LEDs 120 are arranged in a linear arrangement. The linear arrangement may be formed of an array of LEDs e.g. an LED filament, configured with various forms and shapes on the carrier 130. The second plurality of LEDs 120 may be arranged in a meandering configuration and/or a spiral configuration. The array of LEDs, forming the linear arrangement, may have a length L. The length L of the array of LEDs e.g. the length of the LED filament may be in the range of 6 to 120 cm. The array of LEDs, forming the linear arrangement, may have width W. The width W of the array of LEDs e.g. the width of an LED filament may be in the range of 1 to 5 mm. The length of the second plurality of LEDs 120 i.e. the array of LEDs forming the second plurality of LEDs, may be at least twice a length of an LED column of the plurality of LED columns 112, 114, 116 of the first plurality of LEDs 110. The length of the second plurality of LEDs 120 i.e. the array of LEDs forming the second plurality of LEDs 120, may be at least twice a length of an LED row of the plurality of LED rows 113, 115, 117 of the first plurality of LEDs 110. The array of LEDs, forming the linear arrangement, may comprise a plurality of LEDs extending along the X direction. A number of the plurality of LEDs of the array of LEDs e.g. a number of LEDs of an LED filament, extending along the X direction, may at least be 10 LEDs, more preferably 20 LEDs, most preferably 30 LEDs such as 50 LEDs or 70 LEDs. The array of LEDs, forming the linear arrangement, may comprise a plurality of LEDs extending along the Y direction. A number of the plurality of LEDs of the array of LEDs e.g. a number of LEDs of an LED filament, extending along the Y direction, may at most be 2 LEDs. A ratio between the number of LEDs of the second plurality of LEDs 120 arranged along the length L and the number of LEDs of the second plurality of LEDs 120 arranged along the width W may be at least 10.

FIG. 1 shows that the linear arrangement has a meandering configuration. The second plurality of LEDs 120 may be arranged in a meandering configuration and/or a spiral configuration. The meandering configuration may have regular turns. The meandering configuration may have irregular turns. The meandering configuration may preferably have 3 turns. The meandering configuration may more preferably have 4 turns. The meandering configuration may most preferably have 5 turns. The linear arrangement may have any other configurations. The second plurality of LEDs 120, having the meandering configuration shown in FIG. 1, has a shorter extension, than the length L of the array of LEDs e.g. than the length of the LED filament, along the X direction due to the turns. The meandering configuration, shown in FIG. 1, may have an extension along the X direction in the range of 3 to 60. The second plurality of LEDs 120, having the meandering configuration shown in FIG. 1, has a larger extension, than the width W of the array of LEDs, along the Y direction due to the turns. The meandering configuration, shown in FIG. 1, may have an extension along the Y direction. The extension of the meandering configuration along the Y direction may be smaller than the length of an LED column of the first plurality of LED columns. FIG. 1 further shows that LEDs of the second plurality of LEDs 120 are spaced apart from each other with a third spacing S3. The third spacing S3 is smaller than the first and the second spacings S1, S2. The first spacing S1 and the second spacing S2 may be at least three times larger than the third spacing S3.

Still in connection with FIG. 1, the second plurality of LEDs 120 are arranged in between LEDs of the first plurality of LEDs 110 and within the first and the second spacings S1, S2. In other words, FIG. 1 shows that turns of the second plurality of LEDs 120 having the meandering configuration are arranged in between LEDs of the first plurality of LEDs 110 and within the first and the second spacings S1, S2. FIG. 1 shows that each turn of the meandering configuration is arranged within the first spacings on opposite sides of an LED column of the plurality of LED columns. Each turn of the meandering configuration may be arranged within the first spacings on opposite sides of more than one LED column e.g. two LED columns of the plurality of LED columns. FIG. 1 shows that each turn of the meandering configuration, at least partially, surrounds an LED column of the plurality of LED columns. Each turn of the meandering configuration may at least surround two LEDs of the LED column. Each turn of the meandering configuration may preferably surround three LEDs of an LED column or LED columns of the first plurality of LEDs. Each turn of the meandering configuration may more preferably surround five LEDs of an LED column or LED columns of the first plurality of LEDs. The second plurality of LEDs may be electrically connected to each other. For instance, the second plurality of LEDs may be electrically connected in series with each other.

Still in connection with FIG. 1, the first and the second plurality of LEDs 110, 120 may independently be controllable. The light emitting device 100 may further comprise a controller 170. The controller may independently control the first plurality of LEDs 110 and the second plurality of LEDs 120. For instance, the controller 170 may turn on, turn off, or vary an intensity of the first and/or the second plurality of LEDs 110, 120 regardless of the status of the other one of the first or the second plurality of LEDs 110, 120. The controller 170 may be any conventional and commercially available controller.

Still in connection with FIG. 1, the first plurality of LEDs 110 may provide first light. The second plurality of LEDs 120 may provide second light. The first light and second light may differ in one or more of color point, color temperature, and color rendering index. The first plurality of LEDs 110 may be encapsulated by a first encapsulant comprising a first luminescent material. The second plurality of LEDs 120 may be encapsulated by a second encapsulant comprising a second luminescent material. The first and the second encapsulants may be different. The first encapsulant may e.g. be a polymer. The first encapsulant may e.g. be a silicone of a first type. The first encapsulant may be deposited on single LEDs. The second encapsulant may e.g. be a polymer. The second encapsulant may e.g. be a silicone of a second type. The second encapsulant may be deposited on a plurality of LEDs of the second plurality of LEDs. For instance, the second encapsulant may be deposited on 10 or more LEDs of the second plurality of LEDs. Alternatively, or in combination, the first encapsulant and the second encapsulant may have different thicknesses. Alternatively, or in combination, the first encapsulant and the second encapsulant may have different concentration of the luminescent material. The LEDs of the first plurality of LEDs 110 may be configured to emit light of a first color temperature CT1. The LEDs of the second plurality of LEDs 120 may be configured to emit light of a second color temperature CT2. The second color temperature CT2 may be different from the first color temperature CT1. The first color temperature CT1 may be larger than 2700 K. The second color temperature CT2 may be smaller than 2400 K. A difference between the first color temperature CT1 and the second color temperature CT2 may be larger than 300 K. The difference between the first color temperature CT1 and the second color temperature CT2 may preferably be larger than 500 K. The difference between the first color temperature CT1 and the second color temperature CT2 may more preferably be larger than 800 K. For instance, the difference between the first color temperature CT1 and the second color temperature CT2 may be 1000 K. A luminous flux of each LED 112, 113, 114, 115, 116, 117 of the first plurality of LEDs 110 may be at least twice a luminous flux of each LED 122, 124, 126 of the second plurality of LEDs 120. For instance, LEDs of the first plurality of LEDs 110 may have a higher performance than LEDs of the second plurality of LEDs 120 and hence more luminous flux. Another example, the LEDs of the first plurality of LEDs 110 may have a higher current than LEDs of the second plurality of LEDs 120 and hence more luminous flux. Another example, the LEDs of the first plurality of LEDs 110 may have a lager light output surface than the LEDs of the second plurality of LEDs 120 and hence more luminous flux. For instance, the LEDs of the first plurality of LEDs 110 may have a light output surface of $1\times1$ $mm^2$ whereas the LEDs of the second plurality of LEDs 110 may have a light output surface of $0.7\times0.7$ $mm^2$.

Figures 2A, 2B, 2C:
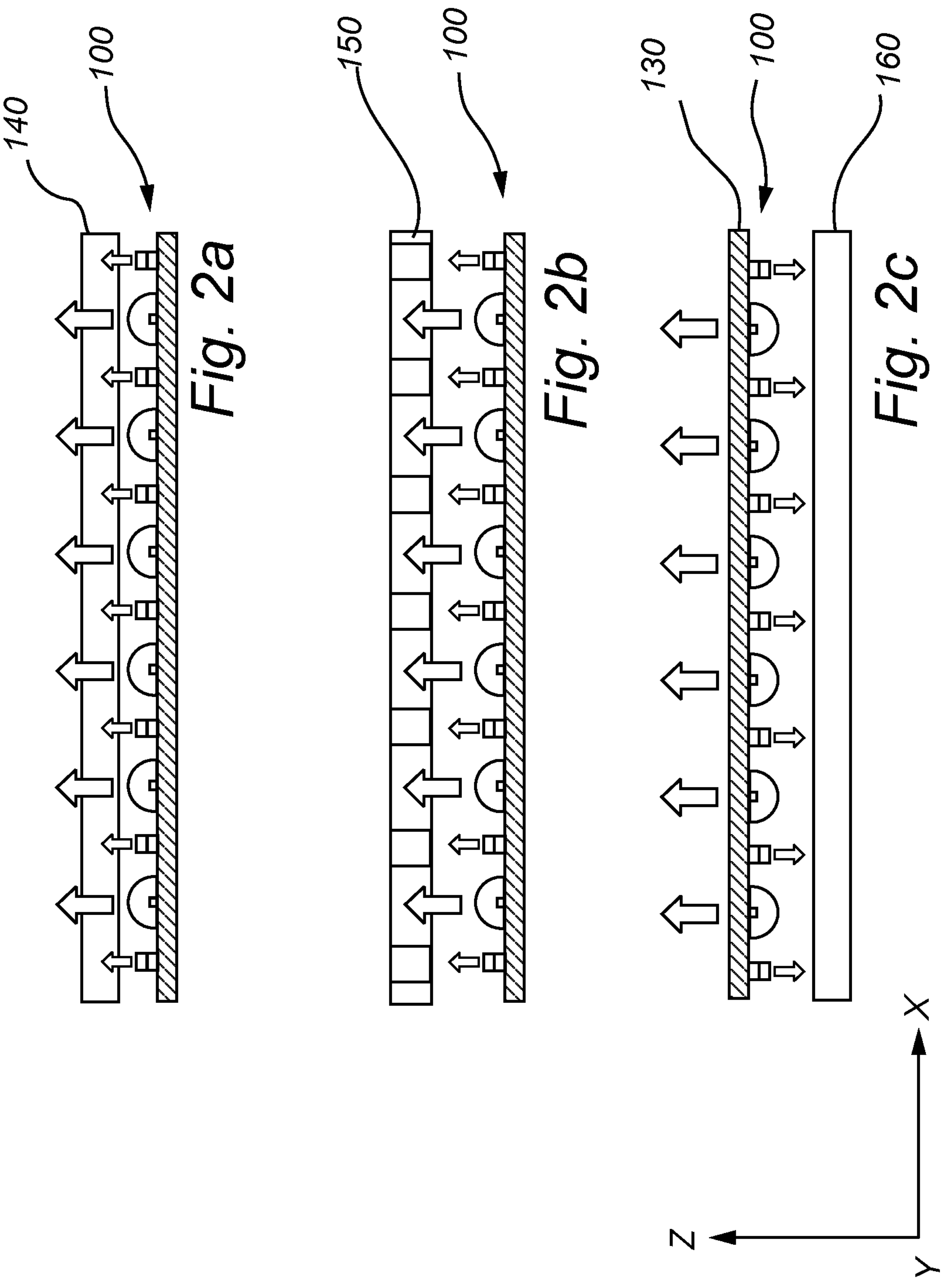
FIG. 2*a* schematically illustrates a cross-sectional view of a light emitting device comprising a light diffusive layer.
FIG. 2*b* schematically illustrates a cross-sectional view of a light emitting device comprising a patterned light exit window.
FIG. 2*c* schematically illustrates a cross-sectional view of a light emitting device comprising a reflective layer.

In connection with FIG. 2*a*, a cross-sectional view of another light emitting device 100 is shown. The light emitting device, shown in FIG. 2*a*, may be provided in the same manner as the light emitting device 100, shown in FIG. 1. The light emitting device 100, shown in FIG. 2, further comprises a light diffusive layer 140. FIG. 2*a* shows that the light diffusive layer 140 is arranged above the first and the second plurality of LEDs 110, 120. The light diffusive layer 140 may be formed of any of or any combination of plastic and ceramic e.g. sand blasted glass. Alternatively, or in combination, the light diffusive layer 140 may comprise diffusive particles to diffuse light emitted by the first and the second plurality of LEDs 110, 120. The light diffusive layer 140 may have different colors such as white and yellow.

In connection with FIG. 2*b*, a cross-sectional view of a yet another light emitting device 100 is shown. The light emitting device, shown in FIG. 2*b*, may be provided in the same manner as the light emitting device 100, shown in FIG. 1. The light emitting device 100, shown in FIG. 2*b*, further comprises a patterned light exit window 150. The patterned light exit window 150, shown in FIG. 2*b*, is arranged above the first and the second plurality of LEDs 110, 120. The patterned light exit window 150, shown in FIG. 2*b* comprises a first pattern area and a second pattern area. The first pattern area may be arranged above the first plurality of LEDs 110. The second pattern area may be arranged above the second plurality of LED 120. The first pattern area and the second pattern area may have different light transmissions. For instance, the first pattern area and the second pattern area may have different color filters. The first pattern area and the second pattern area may have various shapes e.g. square shape or circular shape.

In connection with FIG. 2*c*, a cross-sectional view of a yet another light emitting device 100 is shown. The light emitting device 100, shown in FIG. 2*c*, may be provided in the same manner as the light emitting device 100, shown in FIG. 1. The carrier 130 of the light emitting device 100, shown in FIG. 2*c*, is light transmissive. FIG. 2*c* shows that a back surface of the carrier 130 of the light emitting device 100 faces outwards. In other words, FIG. 2*c* shows that the back surface of the carrier 130 of the light emitting device 100 transmits light emitted by the first and the second plurality of LEDs 110, 120. FIG. 2*c* further shows that the light emitting device 100 comprises a reflective layer 160. The reflective layer 160 may be formed of any of or any combination of coating, a layer formed of silver or aluminum, a diffuse layer formed of $BaSO_4$, $TiO_2$ and/or $Al_2O_3$ particles in a polymer matrix e.g. silicone. The reflective layer 160 may reflect light emitted by the first and the second plurality of LEDs 110, 120 towards the front surface of the light transmissive carrier 130.

Figure 3:
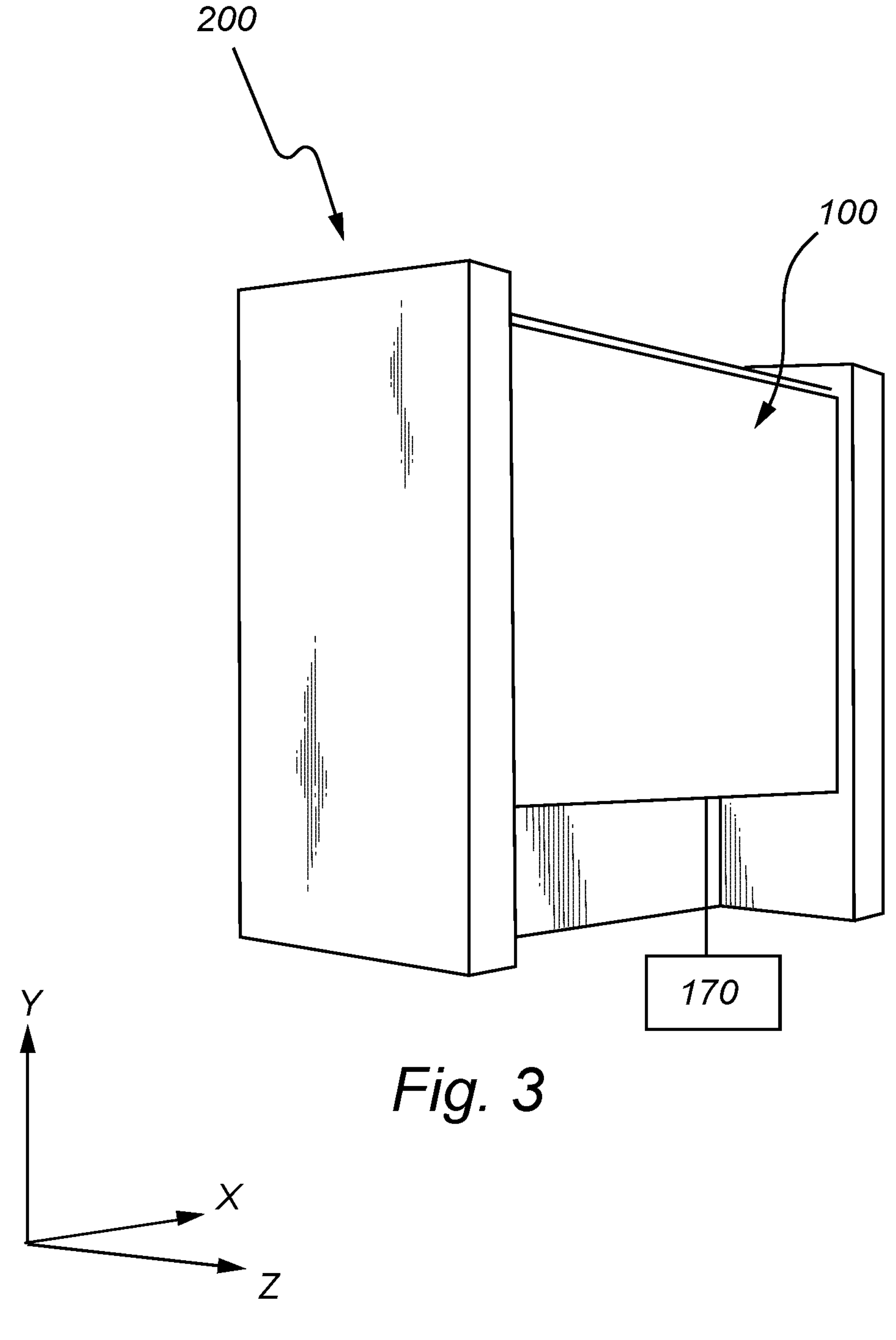
FIG. 3 schematically illustrates a perspective view of a luminaire.

In connection with FIG. 3, a perspective view of a luminaire 200 is shown. The luminaire 200 comprises a light emitting device 100. The light emitting device 100 of the luminaire 200 may be any one of the light emitting devices 100 shown in FIGS. 1-2*c*. The luminaire 200 shown in FIG. 3 has been used as wall light. The luminaire 200 shown in FIG. 3 may be used in a different manner e.g. as ceiling light. The luminaire 200 shown in FIG. 3 may be used indoor or outdoor. The first and the second plurality of LEDs 110, 120 of the luminaire 200 may independently be controllable by the controller 170.

In Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:

a carrier comprising:

a first plurality of LEDs arranged in a matrix arrangement, the matrix arrangement having a plurality of LED columns and a plurality of LED rows, wherein LED columns of the plurality of LED columns are spaced apart from each other with a first spacing and LED rows of the plurality of LED rows are spaced apart from each other with a second spacing, and a second plurality of LEDs arranged in a linear arrangement, the linear arrangement having a length larger than a width, wherein LEDs of the second plurality of LEDs are spaced apart from each other with a third spacing, the third spacing being smaller than the first and the second spacings and wherein the second plurality of LEDs are arranged in between LEDs of the first plurality of LEDs and within the first and the second spacings, wherein a ratio between a number of LEDs of the second plurality of LEDs arranged along the length and a number of LEDs of the second plurality of LEDs arranged along the width is at least 10, or the length of the second plurality of LEDs is at least twice a length of an LED column of the plurality of LED columns and/or is twice a length of an LED row of the plurality of LED rows of the first plurality of LEDs.

2. The light emitting device according to claim 1, wherein the first spacing and the second spacing are at least three times larger than the third spacing.

3. The light emitting device according to claim 1, wherein the first plurality of LEDs provide first light and the second plurality of LEDs provide second light, wherein the first light and second light differ in one or more of color point, color temperature, and color rendering index.

4. The light emitting device according to claim 1, wherein the first plurality of LEDs is encapsulated by a first encapsulant comprising a first luminescent material, wherein the second plurality of LEDs is encapsulated by a second encapsulant comprising a second luminescent material, and wherein the first and the second encapsulants are different.

5. The light emitting device according to claim 1, wherein LEDs of the first plurality of LEDs are configured to emit light of a first color temperature, CT1, and the LEDs of the second plurality of LEDs are configured to emit light of a second color temperature, CT2, wherein $CT1>2700$ K and $CT2<2400$ K, and wherein $CT1-CT2>300$ K.

6. The light emitting device according to claim 1, wherein a luminous flux of each LED of the first plurality of LEDs is at least twice a luminous flux of each LED of the second plurality of LEDs.

7. The light emitting device according to claim 1, the light emitting device further comprising a light diffusive layer, the light diffusive layer being arranged above the first and the second plurality of LEDs.

8. The light emitting device according to claim 1, the light emitting device further comprising a patterned light exit window, the patterned light exit window being arranged above the first and the second plurality of LEDs, wherein the patterned light exit window comprises a first pattern area and a second pattern area, wherein the first pattern area is arranged above the first plurality of LEDs and the second pattern area is arranged above the second plurality of LED, wherein the first pattern area and the second pattern area have different light transmissions.

9. The light emitting device according to claim 1, wherein the carrier is light transmissive.

10. The light emitting device according to claim 1, wherein the plurality of LED columns of the first plurality of LEDs comprises at least three LED columns and wherein the plurality of LED rows of the first plurality of LEDs comprises at least three LED rows.

11. The light emitting device according to claim 1, wherein the first plurality of LEDs is electrically connected to each other and wherein the second plurality of LEDs is electrically connected to each other such that the first and the second plurality of LEDs are independently controllable and wherein the light emitting device further comprises a controller for independently controlling the first plurality of LEDs and the second plurality of LEDs.

12. The light emitting device according to claim 1, wherein the second plurality of LEDs are arranged in a meandering configuration and/or a spiral configuration.

13. A luminaire comprising a light emitting device according to claim 1.

* * * * *